(12) United States Patent
Sattayatam et al.

(10) Patent No.: US 10,160,189 B2
(45) Date of Patent: Dec. 25, 2018

(54) POLYIMIDE AEROGEL INSULATED PANEL ASSEMBLY

(71) Applicant: C&D Zodiac, Inc., Huntington Beach, CA (US)

(72) Inventors: Panade Sattayatam, Huntington Beach, CA (US); James Del Pinto, Huntington Beach, CA (US); Douglas Long, Huntington Beach, CA (US)

(73) Assignee: C&D ZODIAC, INC., Huntington Beach, CA (US)

( * ) Notice: Subject to any disclaimer, the term of this patent is extended or adjusted under 35 U.S.C. 154(b) by 333 days.

(21) Appl. No.: 14/574,072

(22) Filed: Dec. 17, 2014

(65) Prior Publication Data

US 2015/0165736 A1   Jun. 18, 2015

Related U.S. Application Data

(60) Provisional application No. 61/917,255, filed on Dec. 17, 2013.

(51) Int. Cl.
*B32B 27/28* (2006.01)
*B32B 37/14* (2006.01)
(Continued)

(52) U.S. Cl.
CPC ............ *B32B 37/146* (2013.01); *A47J 39/00* (2013.01); *B32B 3/12* (2013.01); *B32B 5/26* (2013.01); *B32B 7/12* (2013.01); *B32B 27/12* (2013.01); *B32B 29/02* (2013.01); *B32B 37/12* (2013.01); *B32B 2255/02* (2013.01); *B32B 2255/26* (2013.01); *B32B 2260/021* (2013.01); *B32B 2260/046* (2013.01); *B32B 2262/101* (2013.01); *B32B 2262/106* (2013.01); *B32B 2305/022* (2013.01); *B32B 2305/076* (2013.01); *B32B 2307/304* (2013.01); *B32B 2307/558* (2013.01); *B32B 2379/08* (2013.01); *B32B 2605/18* (2013.01); *B32B 2607/00* (2013.01); *Y10T 428/24149* (2015.01); *Y10T 428/24157* (2015.01); *Y10T 428/24999* (2015.04); *Y10T 428/249953* (2015.04);
(Continued)

(58) Field of Classification Search
CPC .............................................. Y10T 428/24157
See application file for complete search history.

(56) References Cited

U.S. PATENT DOCUMENTS 5,156,895 A * 10/1992 Martin ................. F16L 59/028
                                                         423/338
7,468,205 B2   12/2008 Schwertfeger
(Continued)

OTHER PUBLICATIONS

International Search Report and Written Opinion issued in PCT/US2014/070957 dated Mar. 20, 2015.
EP14872374.5 Supplementary Search Report dated Aug. 3, 2017.

*Primary Examiner* — Mark Ruthkosky
*Assistant Examiner* — Julia L Rummel
(74) *Attorney, Agent, or Firm* — Jeffer Mangels; Butler & Mitchell LLP; Brennan C. Swain, Esq.

(57) ABSTRACT

A panel assembly that includes a core having first and second opposing major surfaces, a first laminate skin secured to the first major surface of the core, a second laminate skin secured to the second major surface of the core, and at least a first layer of polyimide aerogel incorporated into one of the first laminate skin or the second laminate skin.

5 Claims, 3 Drawing Sheets

(51) Int. Cl.
    *B32B 3/12*     (2006.01)
    *B32B 5/26*     (2006.01)
    *B32B 7/12*     (2006.01)
    *B32B 27/12*     (2006.01)
    *B32B 29/02*     (2006.01)
    *A47J 39/00*     (2006.01)
    *B32B 37/12*     (2006.01)

(52) U.S. Cl.
    CPC ................ *Y10T 428/249981* (2015.04); *Y10T 428/249982* (2015.04); *Y10T 428/249983* (2015.04)

(56) References Cited

U.S. PATENT DOCUMENTS

| | | | |
|---|---|---|---|
| 7,833,916 B2 | 11/2010 | Leeser et al. | |
| 8,342,588 B2 | 1/2013 | Skaradzinski | |
| 2005/0208321 A1* | 9/2005 | Riley | B29C 70/086 428/593 |
| 2006/0189236 A1* | 8/2006 | Davis | B32B 27/04 442/136 |
| 2006/0269734 A1 | 11/2006 | Krajewski | |
| 2008/0174147 A1 | 7/2008 | Skaradzinski | |
| 2014/0255642 A1* | 9/2014 | White | C08G 73/10 428/71 |
| 2014/0287641 A1* | 9/2014 | Steiner, III | B32B 5/26 442/223 |

\* cited by examiner

POLYIMIDE AEROGEL INSULATED PANEL ASSEMBLY

CROSS REFERENCE TO RELATED APPLICATIONS

This application claims the benefit of U.S. Provisional Application No. 61/917,255, filed Dec. 17, 2013, and U.S. Provisional Application No. 61/929,835, filed Jan. 21, 2014, which are all incorporated by reference herein in their entireties.

FIELD OF THE INVENTION

The present invention relates generally to a panel assembly, and more particularly to a panel assembly insulated by polyimide aerogel.

BACKGROUND OF THE INVENTION

Thermal insulation is important on aircraft, particularly, for example, for active chilling/heating systems for food and drinks on an aircraft. The more thermally efficient or thermally insulated panel assemblies (e.g., honeycomb core panels) on an aircraft are, the better. Accordingly, a need exists for a method to insulate a honeycomb core panel assembly and/or a laminate assembly associated with the panel with a material, such as polyimide aerogel, that is of light weight, low thermal conductivity and high compressive strength for the purposes of insulating and withstanding the honeycomb core panel and laminate production processes.

SUMMARY OF THE PREFERRED EMBODIMENTS

In accordance with a first aspect of the present invention there is provided a panel assembly that includes a core having first and second opposing major surfaces, a first laminate skin secured to the first major surface of the core, a second laminate skin secured to the second major surface of the core, and at least a first layer of polyimide aerogel incorporated into one of the first laminate skin or the second laminate skin. In a preferred embodiment, the first laminate skin includes a first ply and the first layer of polyimide aerogel. Preferably, the second laminate skin includes a first ply and a second layer of polyimide aerogel. In a preferred embodiment, the first laminate skin includes first and second plies having the first layer of polyimide aerogel sandwiched therebetween and the second laminate skin includes first and second plies having the second layer of polyimide aerogel sandwiched therebetween. Preferably, the core is a honeycomb core. In a preferred embodiment, the honeycomb core includes polyimide aerogel incorporated therein. The polyimide aerogel is incorporated into one or more cells of the honeycomb core by the steps of applying a polyimide aerogel producing mixture to one or more cells of the honeycomb core; and supercritically drying the mixture to produce a layer of polyimide aerogel on the one or more cells of the honeycomb core.

In accordance with another aspect of the present invention there is provided a method of producing an insulated panel assembly that includes obtaining or providing a core having first and second opposing major surfaces, obtaining or providing a first ply of material, obtaining or providing a first layer of polyimide aerogel, adhering the first layer of polyimide aerogel to the first ply of material to provide a first laminate skin, obtaining or providing a second ply of material, obtaining or providing a second layer of polyimide aerogel, adhering the second layer of polyimide aerogel to the second ply of material to provide a second laminate skin, positioning the first and second laminate skins adjacent to the first and second major surfaces of the core, respectively, to provide a panel assembly, pressing the panel assembly, and heating the panel assembly to provide the insulated panel assembly. In a preferred embodiment, the first laminate skin includes first and second plies that sandwich the first layer of polyimide aerogel therebetween and the second laminate skin includes first and second plies that sandwich the second layer of polyimide aerogel therebetween. Preferably, the method also includes the step of pouring a sol-gel mixture into the honeycomb core prior to heating.

In accordance with another aspect of the present invention there is provided a laminate assembly that includes a first ply comprised of a first material, a first layer of polyimide aerogel adhered to the first ply. In a preferred embodiment, the first material is impregnated with a resin and is either carbon or fiberglass. Preferably, one of the first ply or the first layer of polyimide aerogel includes an adhesive thereon, such that the laminate assembly can be secured to a surface. The present invention also includes an aircraft that has an interior surface having the laminate assembly adhered thereto.

In accordance with another aspect of the present invention there is provided a method for insulating a honeycomb core panel assembly. The method includes providing a layer of aerogel, and incorporating the layer of aerogel into the honeycomb core panel assembly. In a preferred embodiment, the providing a layer of aerogel includes the steps of providing a mixture of a solvent and a polymer, supercritically drying the mixture to remove liquid from the mixture and to generate a mass of aerogel, and preparing the mass of aerogel into a layer of aerogel of a size. Preferably, the incorporating the layer of aerogel includes the steps of positioning the layer of aerogel between a first element of the honeycomb core panel assembly and a second element of the honeycomb core panel assembly, and bonding the layer of aerogel to the first and/or the second elements of the honeycomb core panel assembly. Preferably, the first element and the second element of the honeycomb core panel assembly are plies of a skin of the honeycomb core panel assembly or the first element is a skin of the honeycomb core panel assembly and the second element is a honeycomb core of the honeycomb core panel assembly. In a preferred embodiment, the bonding the layer of aerogel to the first and second elements of the honeycomb core assembly is done by resin bonding or adhesive agent based. The adhesive agent is preferably selected from the group consisting of urethane and mixtures thereof. In a preferred embodiment, the skin of the honeycomb core panel assembly is a laminate skin and the aerogel is polyimide aerogel.

In accordance with another aspect of the present invention there is provided a method for insulating a honeycomb core panel assembly that includes applying an aerogel producing mixture to one or more cells of the honeycomb core, supercritically drying the mixture to generate a layer of aerogel on the honeycomb core, and configuring the honeycomb core into the honeycomb core panel assembly. Preferably, the mixture comprises a solvent and a polymer and produces polyimide aerogel upon critical drying.

In accordance with another aspect of the present invention there is provided a method for modifying a honeycomb core that includes applying an aerogel producing mixture to one or more cells of the honeycomb core, and supercritically drying the mixture to generate a layer of aerogel on the honeycomb core. Preferably, the applying an aerogel producing mixture comprises applying the mixture to one or more cell-defining panels of substrate, wherein the cell-defining panels of substrate are configured into the honeycomb core.

In accordance with another aspect of the present invention there is provided an insulated honeycomb core panel assembly that includes a honeycomb core having top and bottom surfaces, a pair of skins, and one or more layers of aerogel. Each of the pair of skins is attached to one of the top and bottom surfaces of the honeycomb core, and one or more layers of aerogel are incorporated in the honeycomb core panel assembly. Preferably, the one or more layers of aerogel is positioned between and bonded to the honeycomb core and one of the pair of skins. Or the one or more layers of aerogel is positioned between and bonded to the honeycomb core and both of the pair of skins.

In accordance with another aspect of the present invention there is provided a method for insulating a laminate panel assembly. The method includes providing a layer of aerogel and incorporating the layer of aerogel into the laminate assembly. In a preferred embodiment, the incorporating the layer of aerogel comprises the steps of positioning the layer of aerogel between a first ply of the laminate assembly and a second ply of the laminate assembly, and bonding the layer of aerogel to the first ply or the first and second plies of the laminate assembly.

Aerogels are generally highly porous materials exhibiting very low density and very low thermal conductivity. Incorporating a polyimide aerogel into a honeycomb core panel or laminate assembly can provide thermal insulation for aircraft and aircraft part assemblies, and may reduce or even eliminate the need to for active chilling/heating systems food and drinks on an aircraft.

It will be appreciated by those of ordinary skill in the art that polyimide aerogels can be formed by first combining a polymer with a solvent to form a so-gel mixture, and then removing the liquid from the so-gel mixture, through processes such as supercritical drying techniques. Supercritical drying can be done in a solvent extracting autoclave to produce a mass of aerogel. Polyimide aerogels can be molded or machined into a ply of a desired shape, size or thickness. In another embodiment, the aforementioned sol-gel mixtures can be applied to a component or structure to be insulated, and then supercritically dried into forming polyimide gel layers in situ of the component or the structure.

After pouring the sol-gel mixture into the core, the core is placed in an autoclave system where pressure is manipulated so that there is no surface tension and then either chemicals or a vacuum is used to bleed out most to all of the moisture. The aerogel is then formed and then the core is infused with or filled with aerogel.

Polyimide aerogels are taught in U.S. Publication No. 2004/0132845 published on Jul. 8, 2004, the entirety of which is incorporated herein by reference. Polyimide aerogels are also taught in the following publications, the entireties of which are incorporated by reference herein:

"Low Dielectric Polyimide Aerogels As Substrates for Lightweight Patch Antennas" by Mary Ann B. Meador, Sarah Wright, Anna Sandberg, Baochau N. Nguyen, Frederick W. Van Keuls, Carl H. Mueller, Rafael Rodríguez-Solís, and Félix A. Miranda. Published in ACS Applied Materials & Interfaces, Nov. 7, 2012.

"Mechanically Strong, Flexible Polyimide Aerogels Cross-Linked with Aromatic Triamine" by Mary Ann B. Meador, Ericka J. Malow, Rebecca Silva, Sarah Wright, Derek Quade, Stephanie L. Vivod, Haiquan Guo, Jiao Guo, and Miko Cakmak. Published in ACS Applied Materials & Interfaces, Sep. 6, 2012.

"Tailoring Properties of Cross-Linked Polyimide Aerogels for Better Moisture Resistance, Flexibility, and Strength" by Haiquan Guo, Mary Ann B. Meador, Linda McCorkle, Derek J. Quade, Jiao Guo, Bart Hamilton, and Miko Cakmak. Published in ACS Applied Materials & Interfaces, Sep. 6, 2012.

"Tailoring Mechanical Properties of Aerogels for Aerospace Applications" by Jason P. Randall, Mary Ann B. Meador, and Sadhan C. Jana. Published in ACS Applied Materials & Interfaces, Mar. 1, 2011.

"Polyimide Aerogels Cross-Linked through Amine Functionalized Polyoligomeric Silsesquioxane" by Haiquan Guo, Mary Ann B. Meador, Linda McCorkle, Derek J. Quade, Jiao Guo, Bart Hamilton, Miko Cakmak, and Guilherme Sprowl. Published in ACS Applied Materials & Interfaces, Feb. 4, 2011.

The invention, together with additional features and advantages thereof, may be best understood by reference to the following description.

DETAILED DESCRIPTION OF THE PREFERRED EMBODIMENTS

Figure 1:
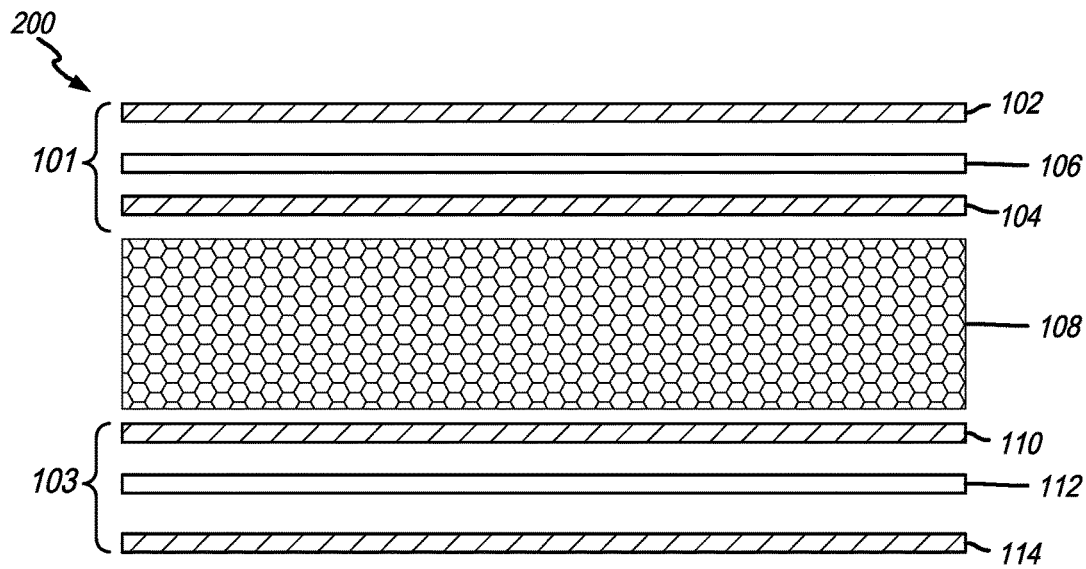
FIG. 1 is a cross sectional exploded view of an exemplary polyimide aerogel insulated honeycomb core panel assembly in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or another embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. Appearances of the phrase "in one embodiment" in various places in the specification do not necessarily refer to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure.

Consequently, alternative language and synonyms may be used for any one or more of the terms discussed herein. Nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-4 show a variety of exemplary embodiments of the present invention.

Described herein are preferred embodiments of a polyimide aerogel insulated panel assembly and a method for making same. The method includes insulating a honeycomb core panel assembly and a laminate assembly with polyimide gels. Generally, the method includes providing a layer of polyimide gel, and incorporating the layer of polyimide gel into the honeycomb core panel assembly, or a laminate assembly. In another embodiment, the method includes providing a polyimide aerogel-producing sol-gel mixture to a honeycomb core structure and supercritically drying the core to form a polyimide gel coated or infused honeycomb core, which can incorporated into a honeycomb core panel assembly.

Referring now to FIG. 1, a preferred embodiment of a honeycomb core panel assembly 100 is shown. It will be appreciated that the core can be material other than a honeycomb material. For example, the core can be a foam material. For exemplary purposes only, the drawings and description herein include a honeycomb core. However, this is not a limitation on the present invention. The honeycomb core 108 can be any known material. For example, the core can be paper, Kevlar, Nomex or the like. The honeycomb core panel assembly 100 generally includes a first laminate skin 101, a honeycomb core 108 and a second laminate skin 103. Generally, the laminate skins can include any number of plies together with one or more layers of polyimide aerogel. For example, as shown in FIG. 1, in a preferred embodiment, the first laminate skin 101 includes a layer of polyimide aerogel 106 positioned between a first ply 102 and a second ply 104, and the second laminate skin 103 includes a layer of polyimide aerogel 112 positioned between a first ply 110 and a second ply 114. Those of the ordinary skill in the art will understand that layers of polyimide aerogel 106 and 112 can be provided in various thicknesses to affect various degrees of thermal insulation.

The plies 102, 104, 110 and 114 can be made of carbon, fiberglass or other desired material. For example, ply 102 can be a fiberglass or carbon weave that is impregnated with resin prior to being adhered to either the core 108 or the polyimide aerogel layer 106. Layers of polyimide aerogel 106 and 112 may be resin bonded to the plies. Adhesives agents such as acrylic based or urethane based adhesives (e.g., 3M 3532) for bonding the various layers together. Generally, to make the panel assembly 100, the layers of skin (plies and polyimide aerogel layer) are sandwiched about the core, adhesive films are provided where desired to adhere the layers together and then the entire assembly is pressed within a hot press and baked and cured to provide a rigid panel assembly 100. Any number of layers of ply and/or any number of layers of polyimide aerogel insulation is within the scope of the present invention. For example, if the panel assembly is to be used in an area that takes a heavy beating, multiple layers of carbon ply can be used to provide impact resistance.

Figure 2:
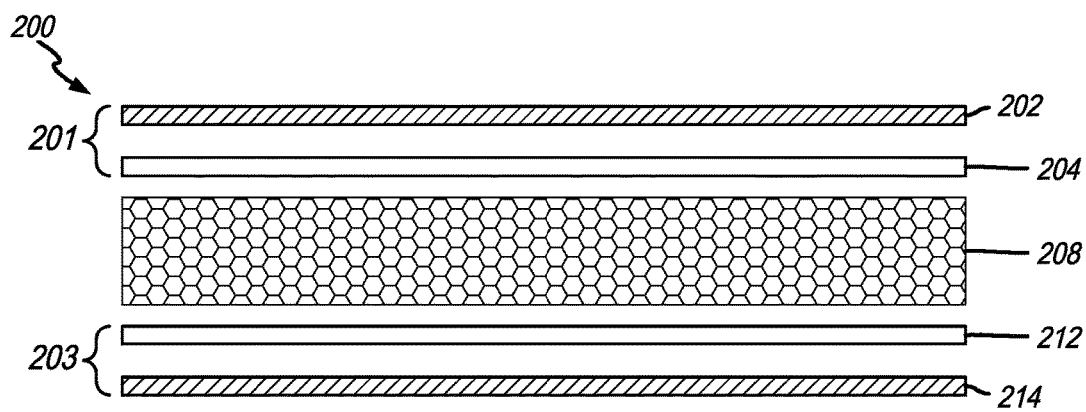
FIG. 2 is a cross sectional exploded view of another exemplary polyimide aerogel insulated honeycomb core panel assembly in accordance with a preferred embodiment of the present invention.

FIG. 2 shows another preferred embodiment of a honeycomb core panel assembly 200 with laminate skins 201 and 203 with only a single ply 202 and 214 together with a layer of polyimide aerogel 204 and 212. As shown, the honeycomb core panel assembly 200 preferably includes a first ply or layer 202, a honeycomb core 208, and a second ply or layer 214. A layer of polyimide aerogel 204 is introduced and positioned between the first ply 202 and the honeycomb core 208. Another layer of polyimide aerogel 212 is additionally or independently introduced and positioned between the second ply or layer 214 and the honeycomb core 208. It should be appreciated that the laminate skins can be one or more plies of fiberglass or carbon laminate (or other material) and the construction may not be symmetrical. For example, in a panel assembly there may be situations where there are more plies (or layers of polyimide aerogel) on one side than another for specific side impact resistance purposes. In another embodiment, the polyimide aerogel insulation may be only used on one side of the panel assembly.

Panel assemblies, such as those described above and shown in FIGS. 1-2 can be used throughout an aircraft, such as in any type of common aircraft monument (e.g., lavatories, galleys, closets, bulkheads, storage areas) or in the walls, ceiling, floor, doors, overhead storage bins and other areas in an aircraft.

Figure 3:
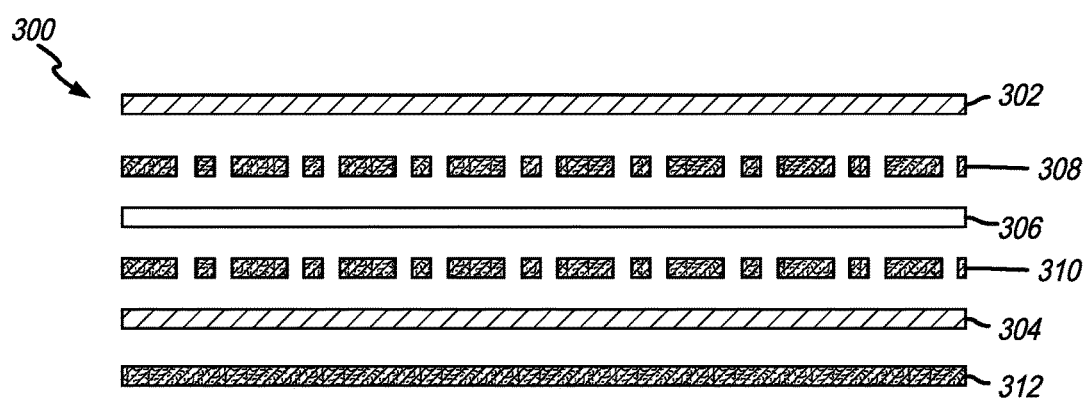
FIG. 3 is a cross sectional view of an exemplary polyimide aerogel insulated laminate assembly in accordance with a preferred embodiment of the present invention.

FIG. 3 shows a polyimide aerogel insulated laminate assembly 300. Generally, the laminate assembly 300 includes at least a first ply or layer 302 together with at least one layer of polyimide aerogel 306. The embodiment shown in FIG. 3 includes the first ply of laminate material 302 and a second ply of laminate material 304 and the layer of polyimide aerogel 306 is introduced and positioned between the first ply 302 and the second ply 304. The layer of polyimide aerogel 306 may be bonded to the first ply 302 using an adhesive layer 308 on one side, and bonded to the second ply 304 using an adhesive layer 310 on the other side. Adhesives may be selected from adhesive agents such as acrylic based or urethane based adhesives (e.g., 3M 3532) for a good quality wet-out and bonding. Other types of adhesives are within the scope of the present invention as well. It will be appreciated that adhesive layer 308 and 310 may form a continuous layer or be applied in a non-continuous manner (as shown in FIG. 3) as long as the effect of the bonding of the polyimide aerogel layer 306 to the first and the second plies 302 and 304 can be achieved. Any number of plies and polyimide aerogel layers is within the scope of the present invention. For example, the insulated laminate assembly may include multiple layers of polyimide aerogel sandwiched between a pair of plies. Furthermore, as shown in FIG. 3, an adhesive layer 312 can be included on the outside surface of one or both of the first and the second plies 302 and 304 so that the laminate assembly 300 can be adhered to a surface.

Figure 4:
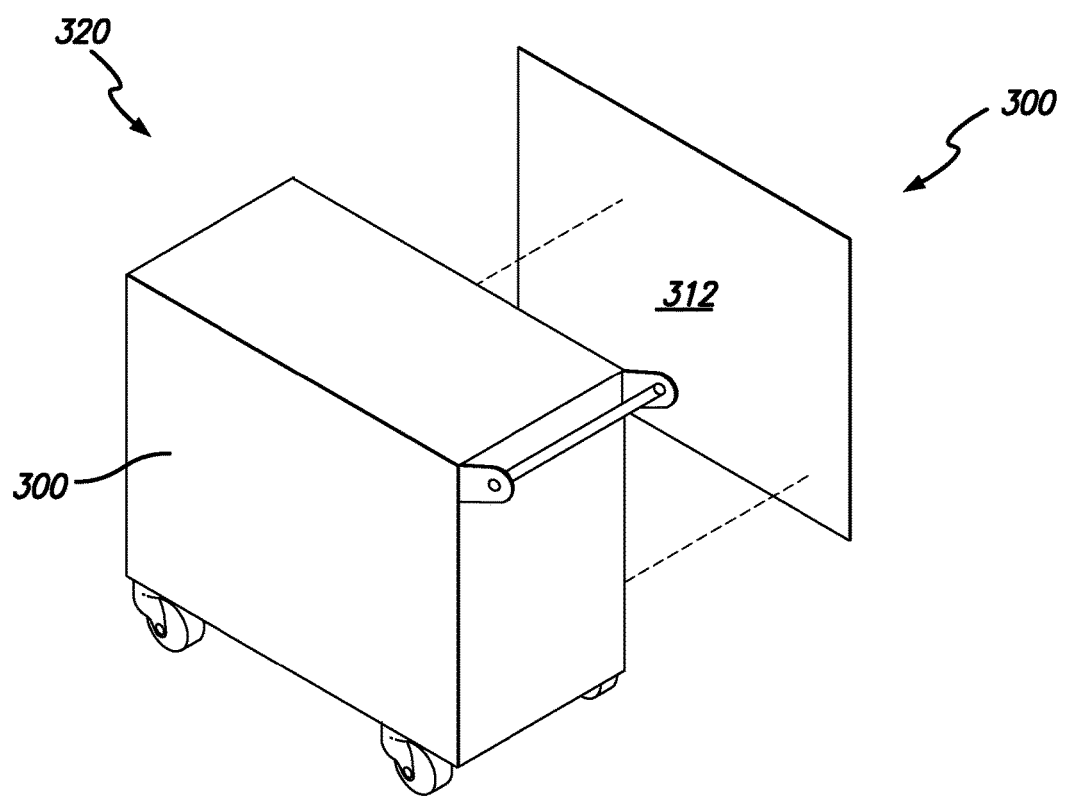
FIG. 4 is a perspective view of an aircraft meal cart with an insulated laminate assembly thereon.

It will be appreciated by those of ordinary skill in the art that the polyimide aerogel insulated laminate assembly 300 can be applied to components within an aircraft or the like. For example, as shown in FIG. 4, one or more laminate assemblies 300 can be adhered to the inside or outside surface of a meal cart 320. FIG. 4 shows a first laminate assembly 300 adhered to one side of the cart 320 and a second laminate assembly 320 exploded form the other side of the meal cart 320. By doing this, the insulative properties of an existing meal cart can be improved. Laminate assemblies 300 can also be used in other areas of an aircraft, such as in any type of common aircraft monument (e.g., lavatories, galleys, closets, bulkheads, storage areas) or on the walls, ceiling, floor, doors, overhead storage bins and other areas in an aircraft where insulation is desired. For example, galleys often include a refrigerated compartment in which it is undesirable for the panels therein to sweat. Also, refrigerated compartments and ovens are often in close proximity. By placing laminate assemblies 300 on the appropriate surfaces, the insulation properties can be improved.

Figure 5:
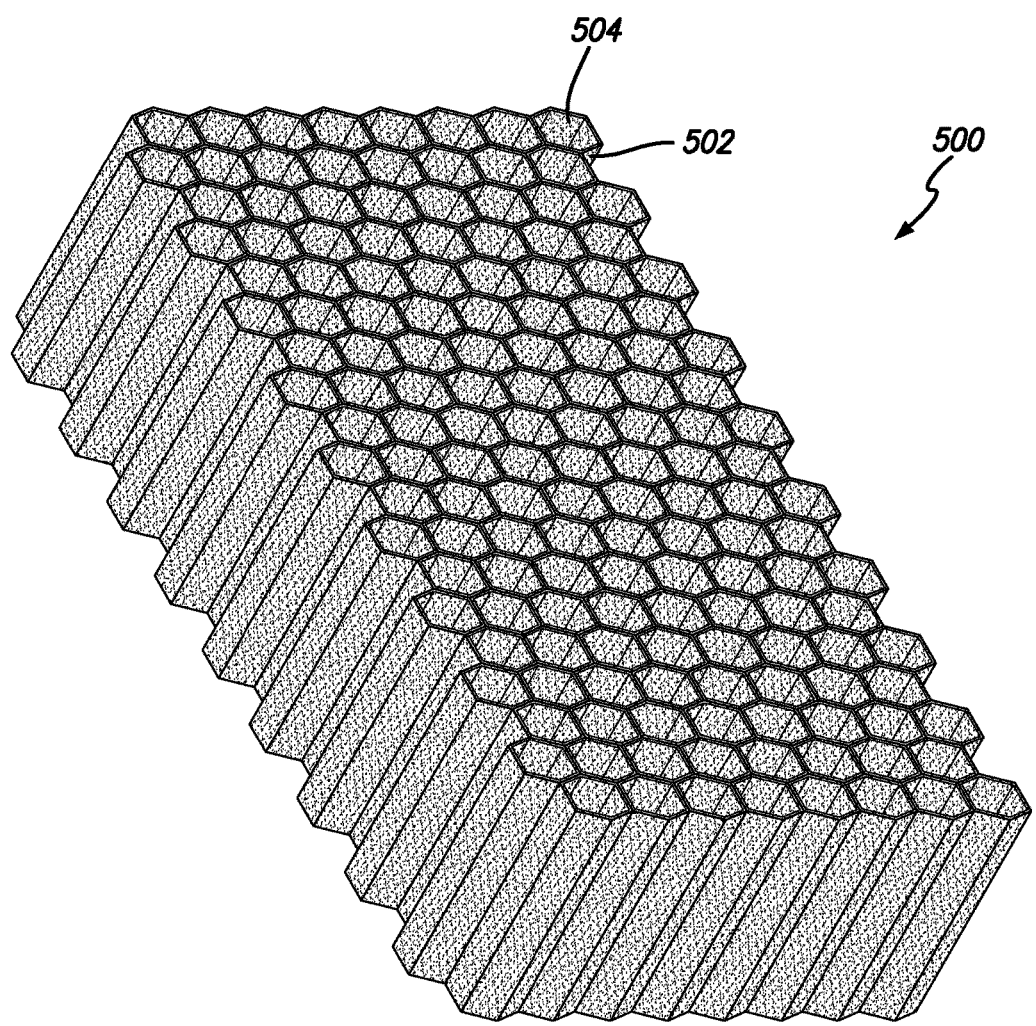
FIG. 5 is a perspective view of an exemplary polyimide aerogel insulated honeycomb core in accordance with a preferred embodiment of the present invention.

FIG. 5 shows a honeycomb core 500 with a polyimide aerogel incorporated or infused therein. The honeycomb core 500 is comprised of a plurality of layers of cell-defining panels, each having an upper surface 502 and bottom surface 504. To create the honeycomb core 500, a polyimide aerogel producing sol-gel mixture is applied to the entire honeycomb core 500 (e.g., by pouring it into the core), certain selective layers of the cell-defining panels of the honeycomb core 500 or certain selective cells of the honeycomb core 500. In one preferred embodiment, the entire honeycomb core 500 may be infused with the so-gel mixture, which is subsequently supercritically dried on the honeycomb core 500 to form a honeycomb core entirely infused or covered with polyimide aerogel. In another preferred embodiment, the sol-gel mixture may be applied selectively to certain the upper and/or bottom surfaces of certain layers of panels of the honeycomb core 500. In this embodiment, after supercritical drying the honeycomb core 500 is partially infused with polyimide aerogel. In an embodiment, polyimide aerogel can be included in both the core (as shown in FIG. 5) and in the laminate skin(s) (as shown in FIGS. 1-2).

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed, at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A panel assembly comprising:
a honeycomb core having first and second opposing major surfaces, wherein the honeycomb core includes a plurality of honeycomb cells comprised of a material, wherein the material is one or more of paper, a para-aramid or a meta-aramid, wherein only a portion of the material of the honeycomb core is infused with a polyimide aerogel, wherein the plurality of honeycomb cells are defined by a plurality of cell-defining layers, and wherein each cell-defining layer has an upper surface co-extensive with the first major surface and a bottom surface co-extensive with the second major surface,
a first laminate skin secured to the first major surface of the core, wherein the first laminate skin includes a first carbon or fiberglass ply bonded to a layer of polyimide aerogel, and
a second laminate skin secured to the second major surface of the core, wherein the second laminate skin includes a first carbon or fiberglass ply bonded to a layer of polyimide aerogel,
wherein the polyimide aerogel is infused into the honeycomb core by the steps of applying a polyimide aerogel producing mixture to one or more cells of the honeycomb core, and supercritically drying the mixture to produce a layer of polyimide aerogel on the one or more cells of the honeycomb core,
wherein only the upper surface and/or the bottom surface of at least one cell-defining layer includes a polyimide aerogel infused therewith.

2. The panel assembly of claim 1 wherein the first laminate skin includes the first carbon or fiberglass ply of the first laminate skin and a second carbon or fiberglass ply, wherein the layer of polyimide aerogel of the first laminate skin is sandwiched between the first and second carbon or fiberglass plies of the first laminate skin.

3. The panel assembly of claim 2 wherein the second laminate skin includes the first carbon or fiberglass ply of the second laminate skin and a second carbon or fiberglass ply, wherein the layer of polyimide aerogel of the second laminate skin is sandwiched therebetween.

4. The panel assembly of claim 1 wherein only selected cells of the plurality of honeycomb cells include a polyimide aerogel coated thereon or infused therein.

5. The panel assembly of claim 1, wherein only selected cell-defining layers of the plurality of cell-defining layers include a polyimide aerogel coated thereon or infused therein.

* * * * *